United States Patent [19]
Ovshinsky et al.

[11] Patent Number: 6,019,955
[45] Date of Patent: Feb. 1, 2000

[54] ACTIVE NICKEL HYDROXIDE MATERIAL HAVING CONTROLLED WATER CONTENT

[75] Inventors: Stanford R. Ovshinsky, Bloomfield Hills; Rosa T. Young, Troy; Liwei Xu, Troy; Suresh Kumar, Troy, all of Mich.

[73] Assignee: Energy Conversion Devices, Inc., Troy, Mich.

[21] Appl. No.: 08/614,779

[22] Filed: Mar. 8, 1996

[51] Int. Cl.[7] .......................... C01G 53/00; C07F 15/00; C01B 35/10; C01B 17/00

[52] U.S. Cl. .......................... 423/592; 423/277; 423/395; 423/544; 423/300; 423/301; 423/302; 423/303; 423/307; 423/462; 423/466; 423/467; 423/594; 423/275; 423/263; 252/519.1; 556/147; 556/149

[58] Field of Search .......................... 429/223; 423/592, 423/275, 276, 277, 395, 544, 300, 301, 302, 303, 307, 462, 466, 467, 263, 594; 252/521.2, 519.1; 556/147, 149

[56] References Cited

U.S. PATENT DOCUMENTS 5,523,182  6/1996  Ovshinsky et al. ...................... 429/223

FOREIGN PATENT DOCUMENTS 9422767  3/1994  WIPO  ...................................... 423/594

OTHER PUBLICATIONS

Genin, et al., "Preparation and characterization of alpha type nickel hydroxides . . . anionic species" Eur. J. Solid State Inorg. Chem. 28(3–4), pp. 505–518, Apr. 1991.

Primary Examiner—Steven Bos
Attorney, Agent, or Firm—David W. Schumaker; Marvin S. Siskind

[57] ABSTRACT

An nickel hydroxide positive electrode active material which can be made by an ultrasonic precipitation method. The nickel hydroxide active material is characterized by the composition:

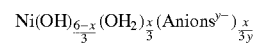

$$Ni(OH)_{\frac{6-x}{3}}(OH_2)_{\frac{x}{3}}(Anions^{y-})_{\frac{x}{3y}}$$

where x, the number of water ligands surrounding each Ni cation, is between 0.05 and 0.4 and y is the charge on the anions.

20 Claims, 2 Drawing Sheets

ACTIVE NICKEL HYDROXIDE MATERIAL HAVING CONTROLLED WATER CONTENT

FIELD OF THE INVENTION

The present invention relates to an electrochemically active nickel hydroxide materials for use in rechargeable battery positive electrodes. More specifically, the instant invention relates to a spherical nickel hydroxide particulate characterized by the composition:

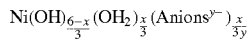

$$Ni(OH)_{6-x \over 3}(OH_2)_{x \over 3}(Anions^{y-})_{x \over 3y}$$

where x, the number of water ligands surrounding each Ni cation, is between 0.05 and 0.4 and y is the charge on the anions.

BACKGROUND OF THE INVENTION

In rechargeable alkaline cells, weight and portability are important considerations. It is also advantageous for rechargeable alkaline cells to have long operating lives without the necessity of periodic maintenance. Rechargeable alkaline cells are used in numerous consumer devices such as calculators, portable radios, and cellular phones. They are often configured into a sealed power pack that is designed as an integral part of a specific device. Rechargeable alkaline cells can also be configured as larger cells that can be used, for example, in industrial, aerospace, and electric vehicle applications.

There are many known types of Ni based cells such as nickel cadmium ("NiCd"), nickel metal hydride ("Ni—MH"), nickel hydrogen, nickel zinc, and nickel iron cells. NiCd rechargeable alkaline cells are the most widely used although it appears that they will be replaced by Ni—MH cells. Compared to NiCd cells, Ni—MH cells made of synthetically engineered materials have superior performance parameters and contain no toxic elements.

Stanford R. Ovshinsky, by applying his fundamental principles of disorder, pioneered the development of the first commercial nickel metal hydride (NiMH) battery. For more than three decades, virtually every other manufacturer in the world studied the NiMH battery technology, but no commercial battery of this kind existed until after the publication of U.S. Pat. No. 4,623,597 to Ovshinsky and Ovshinsky's related technical papers which disclosed basic and fundamentally new principles of battery material design. NiMH batteries are the only truly "green" battery because they can be completely recycled. NiMH batteries are the only rechargeable battery that can meet society's requirements for an ecological, renewable source of electrochemical energy.

As previously mentioned, Stanford R. Ovshinsky was responsible for inventing new and fundamentally different electrochemical electrode materials. As predicted by Ovshinsky, detailed investigation by Ovshinsky's team determined that reliance on simple, relatively pure compounds was a major shortcoming of the prior art. Relatively pure crystalline compounds were found to have a low density of hydrogen storage sites, and the type of sites available occurred accidently and were not designed into the bulk of the material. Thus, the efficiency of the storage of hydrogen and the subsequent release of hydrogen to form water was determined to be poor. By applying his fundamental principles of disorder to electrochemical hydrogen storage, Ovshinsky drastically departed from conventional scientific thinking and created a disordered material having an ordered local environment where the entire bulk of the material was provided with catalytically active hydrogen storage sites.

Short-range, or local, order is elaborated on in U.S. Pat. No. 4,520,039 to Ovshinsky, entitled Compositionally Varied Materials and Method for Synthesizing the Materials, the contents of which are incorporated by reference. This patent discusses how disordered materials do not require any periodic local order and how, by using Ovshinsky's techniques, spatial and orientational placement of similar or dissimilar atoms or groups of atoms is possible with such increased precision and control of the local configurations that it is possible to produce qualitatively new phenomena. In addition, this patent discusses that the atoms used need not be restricted to "d band" or "f band" atoms, but can be any atom in which the controlled aspects of the interaction with the local environment and/or orbital overlap plays a significant role physically, electronically, or chemically so as to affect physical properties and hence the functions of the materials. Ovshinsky's use of disordered materials has fundamental scientific advantages. The elements of these materials offer a variety of bonding possibilities due to the multidirectionality of d-orbitals. The multidirectionality ("porcupine effect") of d-orbitals provides for a tremendous increase in density and hence active storage sites. These techniques result in means of synthesizing new materials which are disordered in several different senses simultaneously.

Ovshinsky had previously found that the number of surface sites could be significantly increased by making an amorphous film that resembled the surface of the desired relatively pure materials. As Ovshinsky explained in *Principles and Applications of Amorphicity, Structural Change, and Optical Information Encoding*, 42 *Journal De Physique* at C4-1096 (October 1981):

Amorphicity is a generic term referring to lack of X-ray diffraction evidence of long-range periodicity and is not a sufficient description of a material. To understand amorphous materials, there are several important factors to be considered: the type of chemical bonding, the number of bonds generated by the local order, that is its coordination, and the influence of the entire local environment, both chemical and geometrical, upon the resulting varied configurations. Amorphicity is not determined by random packing of atoms viewed as hard spheres nor is the amorphous solid merely a host with atoms imbedded at random. Amorphous materials should be viewed as being composed of an interactive matrix whose electronic configurations are generated by free energy forces and they can be specifically defined by the chemical nature and coordination of the constituent atoms. Utilizing multi-orbital elements and various preparation techniques, one can outwit the normal relaxations that reflect equilibrium conditions and, due to the three-dimensional freedom of the amorphous state, make entirely new types of amorphous materials—chemically modified materials.

Once amorphicity was understood as a means of introducing surface sites in a film, it was possible to produce "disorder" that takes into account the entire spectrum of local order effects such as porosity, topology, crystallites, characteristics of sites, and distances between sites. Thus, rather than searching for material modifications that would yield ordered materials having a maximum number of accidently occurring surface irregularities, Ovshinsky's team at ECD began constructing "disordered" materials where the desired irregularities were tailor made. See, U.S. Pat. No. 4,623,597, the disclosure of which is incorporated by reference.

The term "disordered," as used herein corresponds to the meaning of the term as used in the literature, such as the following:

A disordered semiconductor can exist in several structural states. This structural factor constitutes a new variable with which the physical properties of the [material] . . . can be controlled. Furthermore, structural disorder opens up the possibility to prepare in a metastable state new compositions and mixtures that far exceed the limits of thermodynamic equilibrium. Hence, we note the following as a further distinguishing feature. In many disordered [materials] . . . it is possible to control the short-range order parameter and thereby achieve drastic changes in the physical properties of these materials, including forcing new coordination numbers for elements.

S. R. Ovshinsky, *The Shape of Disorder,* 32 *Journal of Non-Crystalline Solids* at 22 (1979) (emphasis added).

The "short-range order" of these disordered materials are further explained by Ovshinsky in *The Chemical Basis of Amorphicity: Structure and Function,* 26: 8–9 *Rev. Roum. Phys.* at 893–903 (1981):

[S]hort-range order is not conserved . . . Indeed, when crystalline symmetry is destroyed, it becomes impossible to retain the same short-range order. The reason for this is that the short-range order is controlled by the force fields of the electron orbitals therefore the environment must be fundamentally different in corresponding crystalline and amorphous solids. In other words, it is the interaction of the local chemical bonds with their surrounding environment which determines the electrical, chemical, and physical properties of the material, and these can never be the same in amorphous materials as they are in crystalline materials . . . The orbital relationships that can exist in three-dimensional space in amorphous but not crystalline materials are the basis for new geometries, many of which are inherently anti-crystalline in nature. Distortion of bonds and displacement of atoms can be an adequate reason to cause amorphicity in single component materials. But to sufficiently understand the amorphicity, one must understand the three-dimensional relationships inherent in the amorphous state, for it is they which generate internal topology incompatible with the translational symmetry of the crystalline lattice . . . What is important in the amorphous state is the fact that one can make an infinity of materials that do not have any crystalline counterparts, and that even the ones that do are similar primarily in chemical composition. The spatial and energetic relationships of these atoms can be entirely different in the amorphous and crystalline forms, even though their chemical elements can be the same.

Short-range, or local, order is elaborated on in U.S. Pat. No. 4,520,039 to Ovshinsky, entitled Compositionally Varied Materials and Method for Synthesizing the Materials, the contents of which are incorporated by reference. This patent discusses how disordered materials do not require any periodic local order and how, by using Ovshinsky's techniques, spatial and orientational placement of similar or dissimilar atoms or groups of atoms is possible with such increased precision and control of the local configurations that it is possible to produce qualitatively new phenomena. In addition, this patent discusses that the atoms used need not be restricted to "d band" or "f band" atoms, but can be any atom in which the controlled aspects of the interaction with the local environment plays a significant role physically, electrically, or chemically so as to affect the physical properties and hence the functions of the materials. These techniques result in means of synthesizing new materials which are disordered in several different senses simultaneously.

By forming metal hydride alloys from such disordered materials, Ovshinsky and his team were able to greatly increase the reversible hydrogen storage characteristics required for efficient and economical battery applications, and produce, for the first time, commercially viable batteries having high density energy storage, efficient reversibility, high electrical efficiency, bulk hydrogen storage without structural change or poisoning, long cycle life, and deep discharge capability.

The improved characteristics of these alloys result from tailoring the local chemical order and hence the local structural order by the incorporation of selected modifier elements into a host matrix. Disordered metal hydride alloys have a substantially increased density of catalytically active sites and storage sites compared to conventional ordered materials. These additional sites are responsible for improved efficiency of electrochemical charging/discharging and an increase in electrical energy storage capacity. The nature and number of storage sites can even be designed independently of the catalytically active sites. More specifically, these disordered multi-component alloys are thermodynamically tailored to allow storage of hydrogen atoms at a wide range of modulated bonding strengths within the range of reversibility suitable for use in secondary battery applications.

Based on these principles of disordered materials, described above, a family of extremely efficient electrochemical hydrogen storage materials were formulated. These are the Ti—V—Zr—Ni type active materials such as disclosed by Ovshinsky's team in U.S. Pat. No. 4,551,400 ("the '400 Patent'"), the disclosure of which is incorporated by reference. These materials reversibly form hydrides in order to store hydrogen. All the materials used in the '400 Patent utilize a Ti—V—Ni composition, where at least Ti, V, and Ni are present with at least one or more of Cr, Zr, and Al. The materials of the '400 Patent are generally multiphase polycrystalline materials, which may contain, but are not limited to, one or more phases of Ti—V—Zr—Ni material with $C_{14}$ and $C_{15}$ type crystal structures. Other Ti—V—Zr—Ni alloys may also be used for fabricating rechargeable hydrogen storage negative electrodes. One such family of materials are those described in U.S. Pat. No. 4,728,586 ("the '586 Patent"), titled Enhanced Charge Retention Electrochemical Hydrogen Storage Alloys and an Enhanced Charge Retention Electrochemical Cell, the disclosure of which is incorporated by reference.

The characteristic surface roughness of the metal electrolyte interface is a result of the disordered nature of the material. Since all of the constituent elements, as well as many alloys and phases of them, are present throughout the metal, they are also represented at the surfaces and at cracks which form in the metal/electrolyte interface. Thus, the characteristic surface roughness is descriptive of the interaction of the physical and chemical properties of the host metals as well as of the alloys and crystallographic phases of the alloys, in an alkaline environment. The microscopic chemical, physical, and crystallographic parameters of the individual phases within the hydrogen storage alloy material are believed to be important in determining its macroscopic electrochemical characteristics.

In addition to the physical nature of its roughened surface, it has been observed that V—Ti—Zr—Ni alloys tend to reach a steady state surface condition and particle size. This steady state surface condition is characterized by a relatively high concentration of metallic nickel. These observations are consistent with a relatively high rate of removal through precipitation of the oxides of titanium and zirconium from the surface and a much lower rate of nickel solubilization. The resultant surface seems to have a higher concentration of nickel than would be expected from the bulk composition of the negative hydrogen storage electrode. Nickel in the metallic state is electrically conductive and catalytic, imparting these properties to the surface. As a result, the surface of the negative hydrogen storage electrode is more catalytic and conductive than if the surface contained a higher concentration of insulating oxides.

The surface of the negative electrode, which has a conductive and catalytic component—the metallic nickel—appears to interact with chromium alloys in catalyzing various hydride and dehydride reaction steps. To a large extent, many electrode processes, including competing electrode processes, are controlled by the presence of chromium in the hydrogen storage alloy material, as disclosed in the '586 Patent.

Because of the increased performance realized by following the teachings of Ovshinsky, the performance of the negative electrodes have increase dramatically in the most recent decade, this in turn has caused the positive nickel hydroxide electrodes to lag behind in performance characteristics and, as a result, to cause a bottleneck in the production of extremely high performance batteries. To this end, Ovshinsky and his colleagues have now turned their focus to the nickel hydroxide electrodes, applying Ovshinsky's fundamentals of disorder to an area which it has never before been applied.

Ni—MH cells utilize a negative electrode that is capable of the reversible electrochemical storage of hydrogen. Ni—MH cells usually employ a positive electrode of nickel hydroxide material. The negative and positive electrodes are spaced apart in the alkaline electrolyte. Upon application of an electrical potential across a Ni—MH cell, the Ni—MH material of the negative electrode is charged by the electrochemical absorption of hydrogen and the electrochemical discharge of a hydroxyl ion, as shown in equation (1):

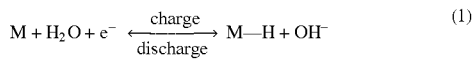

$$M + H_2O + e^- \underset{\text{discharge}}{\overset{\text{charge}}{\rightleftharpoons}} M\text{---}H + OH^- \quad (1)$$

The negative electrode reactions are reversible. Upon discharge, the stored hydrogen is released to form a water molecule and release an electron. The reactions that take place at the nickel hydroxide positive electrode of a Ni—MH cell are shown in equation (2):

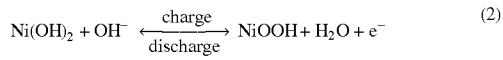

$$Ni(OH)_2 + OH^- \underset{\text{discharge}}{\overset{\text{charge}}{\rightleftharpoons}} NiOOH + H_2O + e^- \quad (2)$$

Ni—MH materials are discussed in detail in U.S. Pat. No. 5,277,999 to Ovshinsky, et al., the contents of which are incorporated by reference.

In alkaline rechargeable cells, the discharge capacity of a nickel based positive electrode is limited by the amount of active material, and the charging efficiencies. The charge capacities of a Cd negative electrode and a MH negative electrode are both provided in excess, to maintain the optimum capacity and provide overcharge protection. Thus, a goal in making the nickel positive electrode is to obtain as high an energy density as possible. The volume of a nickel hydroxide positive electrode is sometimes more important than weight. The volumetric capacity density is usually measured in mAh/cc and specific capacity is written as mAh/g.

At present, sintered or pasted nickel hydroxide positive electrodes are used in NiCd and Ni—MH cells. The process of making sintered electrodes is well known in the art. Conventional sintered electrodes normally have an energy density of around 480–500 mAh/cc. In order to achieve significantly higher loading, the current trend has been away from sintered positive electrodes and toward foamed and pasted electrodes.

Sintered nickel electrodes have been the dominant nickel electrode technology for several decades for most applications. These consist of a porous nickel plaque of sintered high surface area nickel particles impregnated with nickel hydroxide active material either by chemical or electrochemical methods. While expensive, sintered electrodes provide high power, high reliability, and high cycle life, but not the highest energy density. They are likely to remain important for high reliability military and aerospace applications for some time.

Pasted nickel electrodes consist of nickel hydroxide particles in contact with a conductive network or substrate, preferably having a high surface area. There have been several variants of these electrodes including the so-called plastic-bonded nickel electrodes which utilize graphite as a microconductor and also including the so-called foam-metal electrodes which utilize high porosity nickel foam as a substrate loaded with spherical nickel hydroxide particles and cobalt conductivity enhancing additives. Pasted electrodes of the foam-metal type have started to penetrate the consumer market due to their low cost and higher energy density relative to sintered nickel electrodes.

Conventionally, the nickel battery electrode reaction has been considered to be a one electron process involving oxidation of divalent nickel hydroxide to trivalent nickel oxyhydroxide on charge and subsequent discharge of trivalent nickel oxyhydroxide to divalent nickel hydroxide, as shown in equation 2 hereinbelow.

Some recent evidence suggests that quadrivalent nickel is involved in the nickel hydroxide redox reaction. This is not a new concept. In fact, the existence of quadrivalent nickel was first proposed by Thomas Edison in some of his early battery patents. However, full utilization of quadrivalent nickel has never been investigated.

In practice, electrode capacity beyond the one-electron transfer theoretical capacity is not usually observed. One reason for this is incomplete utilization of the active material due to electronic isolation of oxidized material. Because reduced nickel hydroxide material has a high electronic resistance, the reduction of nickel hydroxide adjacent the current collector forms a less conductive surface that interferes with the subsequent reduction of oxidized active material that is farther away.

Ovshinsky and his team have developed positive electrode materials that have demonstrated reliable transfer of more than one electron per nickel atom. Such materials are described in U.S. Pat. Nos. 5,344,728 and 5,348,822 (which describe stabilized disordered positive electrode materials) and U.S. Pat. No. 5,569,563 and 5,567,549.

While Ovonic Battery Company's advances in the positive electrode nickel hydroxide materials have been useful in increasing the capacity of the raw nickel hydroxide materials, production of spherical powders for incorporation into pasted electrodes has heretofore be accomplished by a spray drying technique. It is essential to produce the nickel hydroxide active materials in spherical powder form so that their packing density is high when used in the pasted electrodes. Therefore, since the spray drying process is highly energy intensive, complicated and therefore costly, a simple, economical method for producing spherical nickel hydroxide powder is desirable.

SUMMARY OF THE INVENTION

The instant invention includes an improved nickel hydroxide positive electrode active material which can be made by an ultrasonic or other precipitation methods. The nickel hydroxide active material is characterized by the composition:

$$Ni(OH)_{6-x \over 3}(OH_2)_{x \over 3}(Anions^{y-})_{x \over 3y}$$

where x, the number of water ligands surrounding each Ni cation, is between 0.05 and 0.4 and y is the charge on the anions.

DETAILED DESCRIPTION OF THE INVENTION

The present invention is a nickel hydroxide active material which is characterized by the composition:

$$Ni(OH)_{6-x \over 3}(OH_2)_{x \over 3}(Anions^{y-})_{x \over 3y}$$

where x, the number of water ligands surrounding each Ni cation, is between 0.05 and 0.4 and y is the charge on the anions. The material may be produced by ultrasonic precipitation from liquid ionic precursors. Additionally, the formed nickel hydroxide particulate is spherical and is therefore very useful as a positive electrode material in pasted nickel hydroxide battery electrodes, as its spherical shape provides for a good packing density.

EXAMPLE

A metal nitrate solution containing nickel, cobalt and calcium metal ions was produced. The metal nitrate solution was a 1 molar solution containing 90 mole % $Ni(NO_3)_2$, 6 mole % $Ca(NO_3)_2$ and 4 mole % $Co(NO_3)_2$. One liter of this metal nitrate solution was used as the starting liquid for a precipitation reaction into which 0.990 liters of a 2 molar ammonium hydroxide solution was added at a rate. During precipitation, the metal nitrate solution into which the ammonium hydroxide is being added is subjected to ultrasonic energy from an ultrasonic bath.

After the precipitation was finished, the precipitate was filtered to remove the mother liquor. The filtrate was then washed by re-slurrying/re-filtering with 2 liters of de-ionized water, 2 liters of 1 molar NaOH, and four more separate additions of 2 liters of de-ionized water, sequentially.

Figure 1:
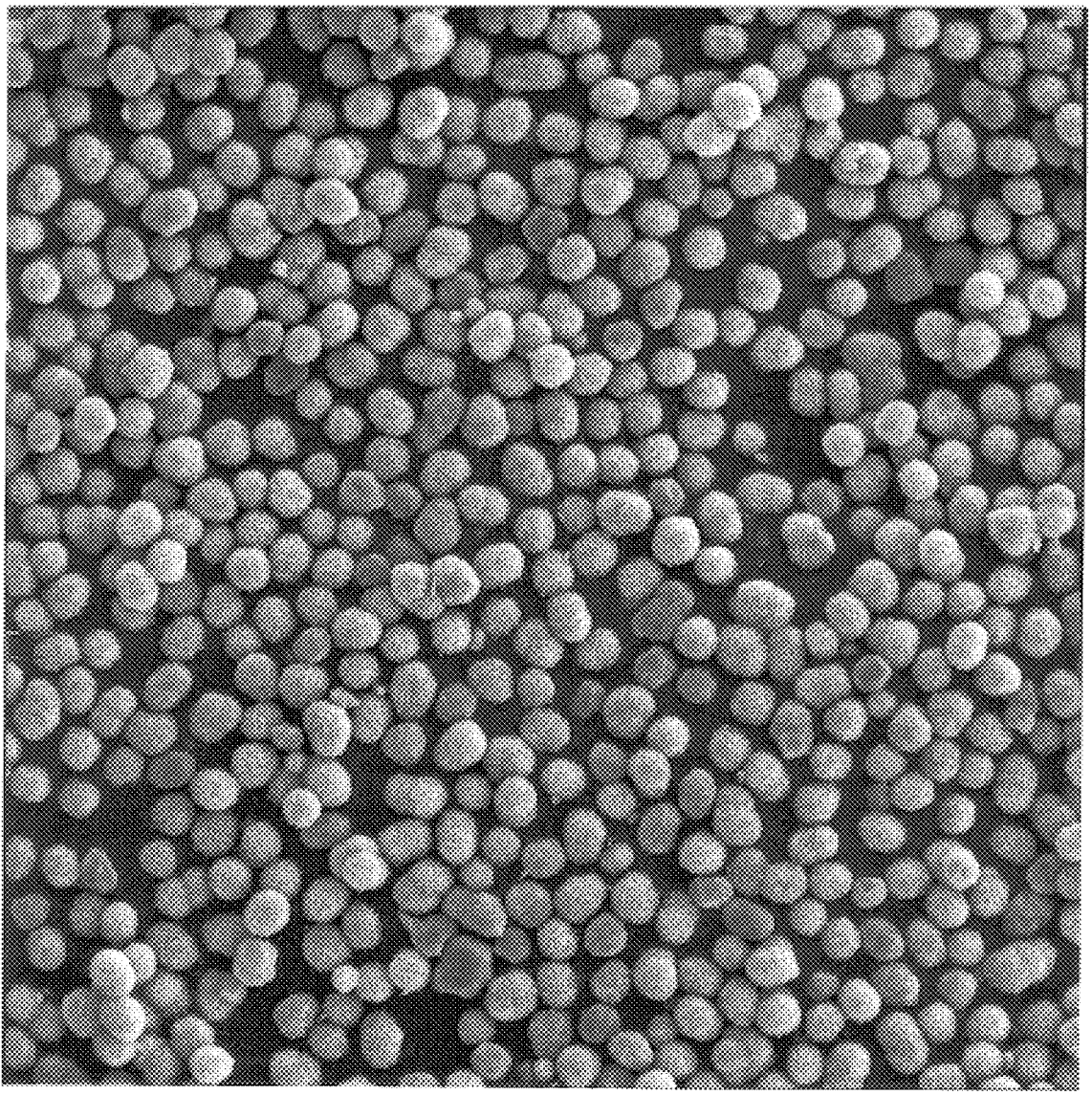
FIG. 1 shows an electron microscope image of spherical nickel hydroxide of the instant invention at a magnification of 2000 X.

The resultant washed/filtered nickel hydroxide cake was then air dried in an oven to remove the excess water, after which the dried cake was ground and sieved. The resultant powder, shown in FIG. 1, was spherical nickel hydroxide particulate of a relatively uniform 3–8 microns in size.

Detailed IR measurements of the instant nickel hydroxide materials have shown that the amount of anions in the system, and the amount of bonded water in the system are not arbitrary. Moreover, the concentrations of the negatively charged anions and that of neutral bonded water are actually linearly related. To account for this behavior, a new structural model for nickel hydroxide has been developed which actually follows the development of the $Ni^{2+}$ ion from its initial stage in the solid hydrated Ni salt, to its state in solution, and finally to its state in the precipitated solid.

The hydrated Ni sulfate salt is commonly written as $NiSO_4 \cdot 6H_2O$. Unfortunately, this expression hides the fact that the water molecules are actually bonded to the Ni ion itself. A more proper way to express this fact is to write the compound as $[Ni(OH_2)_6]SO_4$. In this formulation, the water molecules are "complexed" to the Ni ion in octahedral coordination and the true cation is the entire $[Ni(OH_2)_6]^{2+}$ complex.

Upon dissolution of this Ni aquo salt in water, the sulfate anion is separated from the complexed cation. Therefore, in solution, the Ni ions are not in fact "free" but still maintain their octahedral coordination with water. The process of forming the precipitate is then one of replacing the bonded water with bonded hydroxyl groups. If this reaction goes to completion, we end with the familiar $Ni(OH)_2$ where the Ni cation is also octahedrally coordinated, but with hydroxyls. Note that for this system, charge balance is achieved where the $Ni^{2+}$ cations are balanced by the average of two $(OH)^{1-}$ anions.

If the replacement reaction does not go to completion, i.e., not all of the bonded water is replaced by the hydroxyls, then the $Ni^{2+}$ cation must be balanced by other anions, such as the sulfates, nitrates, etc. For example if the reaction leaves the local octahedral environment centered at the Ni ion with two water molecules because of incomplete replacement, the unit has a net positive charge of +0.67 because each hydroxyl anion is shared by three Ni cations, so that in this representation, the effective hydroxyl charge is $-\frac{1}{3}\theta$. That is, the two bonded water "ligands" physically tie up the sites where two hydroxyls should be located. This material is not purely a hydroxide, but can be called a Ni Aquo/hydroxide.

When we take into account the water, hydroxyl, and other anions, we can derive an expression for the overall stoichiometry of the nickel aquo/hydroxide:

$$Ni(OH)_{6-x \over 3}(OH_2)_{x \over 3}(Anions^{y-})_{x \over 3y}$$

where x is the number of water ligands surrounding each Ni cation and y is the charge on the anions. The anions come from the metal salts used to create the solutions from which the nickel hydroxide is precipitated and can therefore be, for example, nitrates or sulfates. This formula gives the correct stoichiometric expressions for the two endpoints. We see that for each value of x, the total negative charge is fixed at −2, which is nicely balanced by the $Ni^{2+}$ cation. This equation represents the stoichiometry of the as produced powder, or of the discharged state of the positive electrode of the battery. Upon charging, only the proton which belongs to the hydroxyl group participates by leaving the material. When this occurs, the total negative charge increases and so the Ni ion must change its valance state to maintain overall neutrality.

Thus bonded water and the anion contents are linked with the electron transfer efficiency using a minimum number of parameters. The fundamental observable is that the lower the water content, the lower is the contaminant anion content and the greater is the positive electrode capacity. Various alkali "washing" steps, which ostensibly is to remove the contaminant anions, function by first converting the bonded water to hydroxyl groups. With more negative hydroxyls present, the system naturally approaches charge neutrality and there is less of a need to "hang on to" the negative anions.

Figure 2:
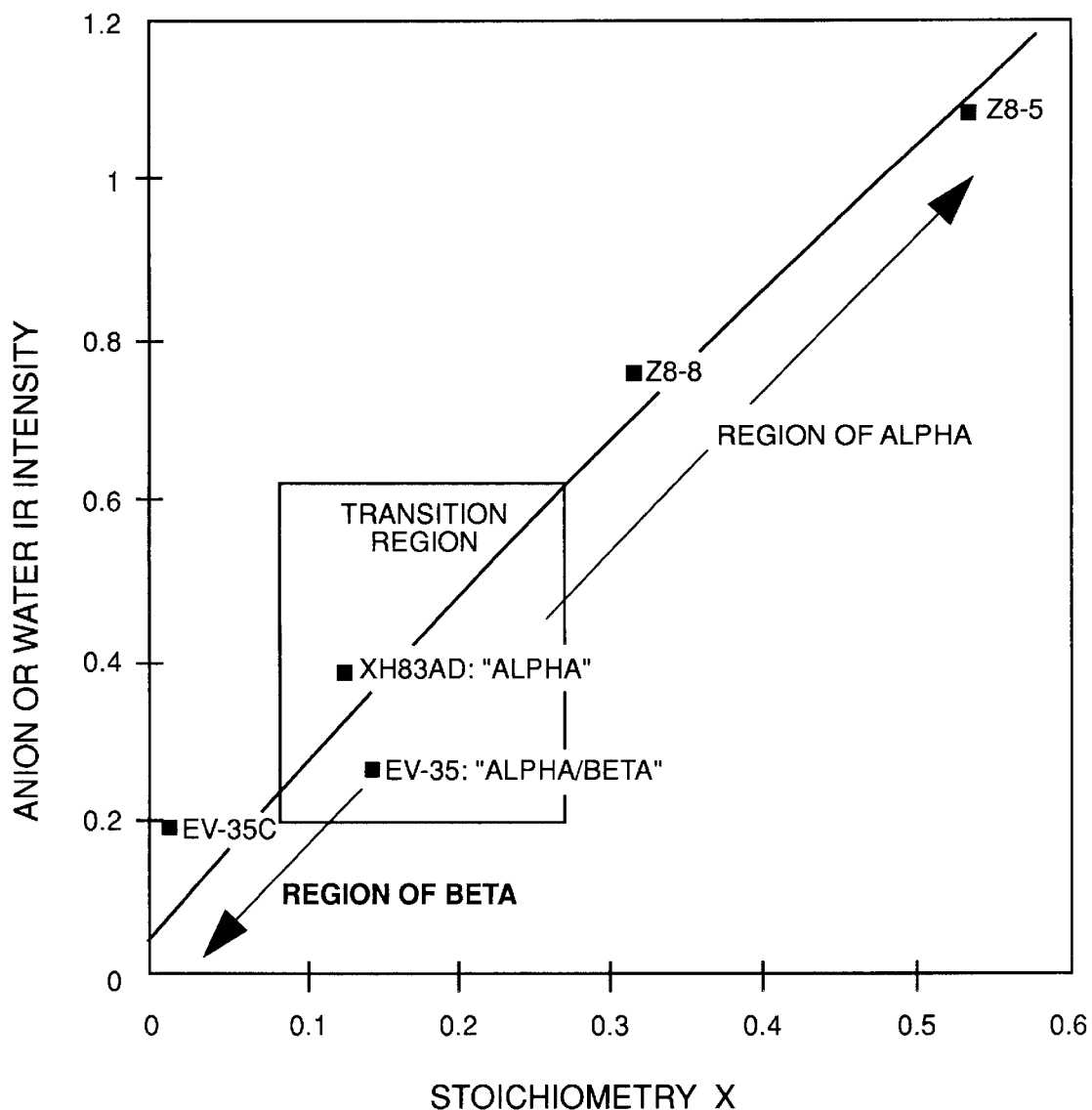
FIG. 2 is a graphical depiction showing the relationship between the value of x in the stoichiometric equation of the nickel hydroxide of the instant invention and the water/anion IR intensity and also showing the relationship between the value of x and the crystallographic structure of the as produced nickel hydroxide material.

FIG. 2 is a graphical depiction showing the relationship between the value of x in the stoichiometric equation of the nickel hydroxide of the instant invention and the water/anion IR intensity. Also, the graph shows the relationship between the value of x and the crystallographic structure of the as produced nickel hydroxide material.

In the prior art standard model of the hydrated nickel hydroxide system, written as $Ni(OH)_2 \cdot zH_2O$, the Ni hydroxide layer is neutral and a somewhat arbitrary amount of water molecules are "intercalated" between these layers. These models also include contaminant anions such as the sulfates, since they are also observed by IR spectroscopy. However, it is clear that to balance the negative sulfate ions, other contaminant cations are needed, such as $Na^+$ or $K^+$ since the $Ni(OH)_2$ layers are themselves completely charged balanced. The amount of anions is also seemingly arbitrary. In this formulation, there can be no connection between the arbitrary water content and the arbitrary contaminant anion content. Moreover, the standard model cannot account for the relationship between the water content and the electron transfer rate.

While the invention has been described with reference to the specific example set forth hereinabove, the true scope of the invention is not to be limited by the example.

Specifically, metal ion solution (and hence the incorporated anions) can be a solution of at least one metal salt selected from the group consisting of borates, nitrates, sulfates, phosphates, carboxylates, fluorides, chlorides, bromides, iodides and mixtures thereof or a solution of at least one organo-metallic compound selected from the group consisting of beta-diketonates, alkoxides, acetylacetonates, acetates, benzoates, methoxides, isopropoxides and mixtures thereof and the like. In fact, as long as the metal ions are soluble, they may come from any known salt or metal-organic compound.

Additionally, the metal ion solution can further include at least one chemical modifier metal ion selected from the group consisting of Al, B, Ba, Ca, Ce, Co, Cr, Cu, Fe, K, Li, Mg, Mn, Na, Sr, Y, Zn and mixtures thereof. Preferably the metal ion solution is selected from one of the following groups:

1) nickel ions, cobalt ions and calcium ions;
2) nickel ions, cobalt ions and cerium ions;
3) nickel ions, cobalt ions, calcium ions and magnesium ions; or
4) nickel ions, cobalt ions, and aluminum ions.

Also, the alkali solution may be a metal hydroxide solution, such as NaOH, KOH, LiOH, and mixtures thereof or the alkali solution may be an ammonium hydroxide solution.

The alkali and metal solutions may be combine in any order, i.e. the alkali solution may be added to the metal ion solution to effect the precipitation of nickel hydroxide; the metal solution may be added to the alkali solution to effect the precipitation of nickel hydroxide or alternatively, the alkali solution and the metal solution may be added together simultaneously to effect the precipitation of nickel hydroxide.

The temperature of precipitation, the mixing rates, the concentrations of the solutions, the stirring rates, and the power and frequency of the ultrasound may all be varied. Specifically at higher ultrasound powers, the density of the nickel hydroxide particulate formed would be higher, thus providing a greater volumetric capacity for the active material. Generally a useful range of frequencies and powers for the ultrasound energy would be a power of between about 20–500 watt/cm² and a frequency of between about 40–2000 kHz.

Therefore, it is to be understood that the disclosure set forth herein is presented in the form of detailed embodiments described for the purpose of making a full and complete disclosure of the present invention, and that such details are not to be interpreted as limiting the true scope of this invention as set forth and defined in the appended claims.

We claim:

1. A nickel hydroxide positive electrode active material, said nickel hydroxide active material being characterized by the composition:

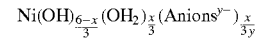

where x, the number of water ligands surrounding each Ni cation, is between 0.05 and 0.4 and y is the charge on the anions.

2. The nickel hydroxide active material of claim 1, wherein said anions are selected from the group consisting of borates, nitrates, sulfates, phosphates, carboxylates, fluorides, chlorides, bromides, iodides and mixtures thereof.

3. The nickel hydroxide active material of claim 1, wherein said material is in the form of spherical nickel hydroxide particulate.

4. The nickel hydroxide active material of claim 2, wherein said material is in the form of spherical nickel hydroxide particulate.

5. The nickel hydroxide active material of claim 1, wherein said nickel hydroxide material further includes at least one chemical modifier selected from the group consisting of Al, B, Ba, Ca, Ce, Co, Cr, Cu, Fe, K, Li, Mg, Mn, Na, Sr, Y, Zn, and mixtures thereof.

6. The nickel hydroxide active material of claim 5, wherein said chemical modifier includes cobalt and calcium.

7. The nickel hydroxide active material of claim 5, wherein said chemical modifier includes cobalt and cerium.

8. The nickel hydroxide active material of claim 5, wherein said chemical modifier includes cobalt and aluminum.

9. The nickel hydroxide active material of claim 5, wherein said chemical modifier includes cobalt, calcium, and magnesium.

10. The nickel hydroxide active material of claim 5, wherein said chemical modifier includes cobalt and manganese.

11. The nickel hydroxide active material of claim 5, wherein said chemical modifier includes cobalt and yttrium.

12. The nickel hydroxide active material of claim 1, wherein said nickel hydroxide material is formed of nanocrystalline nickel hydroxide platelets.

13. The nickel hydroxide active material of claim 2, wherein said nickel hydroxide material further includes at least one chemical modifier selected from the group consisting of Al, B, Ba, Ca, Ce, Co, Cr, Cu, Fe, K, Li, Mg, Mn, Na, Sr, Y, Zn and mixtures thereof.

14. The nickel hydroxide active material of claim 13, wherein said chemical modifier includes cobalt and calcium.

15. The nickel hydroxide active material of claim 13, wherein said chemical modifier includes cobalt and cerium.

16. The nickel hydroxide active material of claim 13, wherein said chemical modifier includes cobalt and aluminum.

17. The nickel hydroxide active material of claim 13, wherein said chemical modifier includes cobalt, calcium, and magnesium.

18. The nickel hydroxide active material of claim 13, wherein said chemical modifier includes cobalt and manganese.

19. The nickel hydroxide active material of claim 13, wherein said chemical modifier includes cobalt and yttrium.

20. The nickel hydroxide active material of claim 2, wherein said nickel hydroxide material is formed of nanocrystalline nickel hydroxide platelets.

* * * * *